(12) United States Patent
Elliott et al.

(10) Patent No.: US 6,431,875 B1
(45) Date of Patent: Aug. 13, 2002

(54) METHOD FOR DEVELOPING AND ADMINISTERING TESTS OVER A NETWORK

(75) Inventors: Kevin Elliott, Charlottesville; Adam Haverson, Northgarden, both of VA (US)

(73) Assignee: Test and Evaluation Software Technologies, Charlottesville, VA (US)

( * ) Notice: Subject to any disclaimer, the term of this patent is extended or adjusted under 35 U.S.C. 154(b) by 0 days.

(21) Appl. No.: 09/372,933

(22) Filed: Aug. 12, 1999

(51) Int. Cl.[7] .................................................. G09B 7/00
(52) U.S. Cl. ........................ 434/322; 434/118; 434/350
(58) Field of Search ................................. 434/118, 322, 434/323, 350, 219, 236

(56) References Cited

U.S. PATENT DOCUMENTS

| | | | |
|---|---|---|---|
| 5,211,564 A | | 5/1993 | Martinez et al. |
| 5,565,316 A | | 10/1996 | Kershaw et al. |
| 5,657,256 A | | 8/1997 | Swanson et al. |
| 5,827,070 A | | 10/1998 | Kershaw et al. |
| 5,909,589 A | | 6/1999 | Parker et al. |
| 6,091,930 A | * | 7/2000 | Mortimer et al. ....... 434/362 X |
| 6,099,320 A | * | 8/2000 | Papadopoulos ......... 434/322 X |
| 6,112,049 A | * | 8/2000 | Sonnenfeld ............. 434/350 X |
| 6,149,438 A | * | 11/2000 | Richard et al. ......... 434/322 X |
| 6,149,441 A | * | 11/2000 | Pelligrino et al. ...... 434/350 X |
| 6,155,840 A | * | 12/2000 | Sallette ................... 434/323 X |
| 6,164,974 A | * | 12/2000 | Carlile et al. ........... 434/322 X |
| 6,190,178 B1 | * | 2/2001 | Oh .......................... 434/323 X |
| 6,282,404 B1 | * | 8/2001 | Linton .................... 434/350 X |
| 6,301,462 B1 | * | 10/2001 | Freeman et al. ........ 434/350 X |

* cited by examiner

Primary Examiner—Joe H. Cheng
Assistant Examiner—Chanda Harris
(74) Attorney, Agent, or Firm—Peter E. Rosden

(57) ABSTRACT

A method for developing and administering tests over a computer network. The method provides a way for test deliverers to develop tests in response to either internal requests or external ones originating from parties, such as employment agencies or prospective employers, desiring to test the knowledge of others, such as potential employees. This original request usually specifies certain criteria, such as the number of questions desired and whether the test should be administered adaptively or not, which are treated as a first set of rules. Based on the original request, pools of prospective questions and answers are developed along with a second set of rules covering such matters as grouping, selection and ordering. The result is a test definition and the creation of a prototest which is then implemented in a test definition language developed specifically for that purpose. After a test candidate requests to take a test, a test generated by the test definition is delivered to the test candidate and administered. The questions asked and the test candidate's answers are returned to the test deliverer for grading and eventual statistical analysis.

3 Claims, 10 Drawing Sheets

FIG. 3A

**Actual Constants *(Value as written)***

```
OpenAngle          =  '<'
CloseAngle         =  '>'
Slash              =  '/'
Equal              =  '='
Quote              =  '"'

TestLabel          =  'TEST'
BlockLabel         =  'BLOCK'
QuestionLabel      =  'QUESTION'
AnswerLabel        =  'ANSWER'
RuleLabel          =  'RULE'
GroupLabel         =  'GROUP'
SelectLabel        =  'SELECT'
OrderLabel         =  'ORDER'
TimeLimitLabel     =  'TIMELIMIT'
StatementLabel     =  'STATEMENT'
CorrectSetLabel    =  'CORRECTSET'
IncorrectSetLabel  =  'INCORRECTSET'

MixedLabel         =  'ANY'

ExactLabel         =  'EXACT'
MinLabel           =  'MIN'
MaxLabel           =  'MAX'
NameLabel          =  'NAME'
TypeLabel          =  'TYPE'
UnitLabel          =  'UNIT'
```

FIG. 3B

Definition Grammar

Common Definitions

```
String              = [a-zA-Z0-9-_.*?]+
Label               = String

Value     'Val'     = Quote . String . Quote

Attr      Attr='val'= Label . Equal . Value

TypeAttr  TYPE='Type'= TypeLabel . Equal . Value

BlockName           = String
QuestionName        = String
AnswerName          = String
GroupName           = String NameAttr            = NameLabel . Equal . Value
          NAME='Name'
TestNameAttr        = NameAttr
BlockNameAttr       = NameAttr
QuestionNameAttr    = NameAttr
AnswerNameAttr      = NameAttr
GroupNameAttr       = NameAttr StatementDef        = StatementTagBegin . Statement . StatementTagEnd
StatementTagBegin   = OpenAngle . StatementLabel . CloseAngle
StatementTagEnd     = OpenAngle . Slash . StatementLabel . CloseAngle
Statement           = String
```

FIG. 3C

Test Definition

```
TestDef         = TestTagBegin . BlockDef* . TestTagEnd
    <TEST ...> ... </TEST>
TestTagBegin    = OpenAngle . TestLabel . TestAttrDef . CloseAngle
    <TEST Attr='Val' ...>
TestTagEnd      = OpenAngle . Slash . TestLabel . CloseAngle
    </TEST>
TestAttrDef     = Attr*
```

Block Definition

```
BlockDef        = BlockTagBegin . ObjectDef* . BlockTagEnd
    <BLOCK ...> ... </BLOCK>
BlockTagBegin   = OpenAngle . BlockLabel . BlockAttrDef . CloseAngle
    <BLOCK TYPE='Type' Attr='Val' ...>
BlockTagEnd     = OpenAngle . Slash . BlockLabel . CloseAngle
    </BLOCK>
BlockAttrDef    = Attr* . BlockTypeAttr . Attr*
BlockTypeAttr   = TypeLabel . Equal
                . (QuestionLabel | AnswerLabel | RuleLabel | MixedLabel)

ObjectDef       = (QuestionDef | AnswerDef | RuleDef)
```

FIG. 3D

Question Definition

```
QuestionDef              = QuestionTagBegin . QuestionStatementDef+ . CorrectAnswerSet
                         . IncorrectAnswerSet . QuestionTagEnd <QUESTION ....>
        <STATEMENT ...>    ...    </STATEMENT>
        <STATEMENT ...>    ...    </STATEMENT>
        <CORRECTSET ...>   ...    </CORRECTSET>
        <INCORRECTSET ...> ...    </INCORRECTSET>
    </QUESTION>

QuestionTagBegin         = OpenAngle . QuestionLabel . QuestionAttrDef . CloseAngle
    <QUESTION Attr='Val' ...>

QuestionTagEnd           = OpenAngle . Slash . QuestionLabel . CloseAngle
    </QUESTION>

QuestionAttrDef          = Attr*
QuestionStatement        = StatementDef
CorrectAnswerSet         = CorrectSetTagBegin . AnswerName* . CorrectSetTagEnd
CorrectSetTagBegin       = OpenAngle . CorrectSetLabel . AnswerSetAttrDef . CloseAngle
    <CORRECTSET>

CorrectSetTagEnd         = OpenAngle . Slash . CorrectSetLabel . CloseAngle
    </CORRECTSET>

IncorrectAnswerSet       = IncorrectSetTagBegin . AnswerName* . IncorrectSetTagEnd
IncorrectSetTagBegin     = OpenAngle . IncorrectSetLabel . AnswerSetAttrDef . CloseAngle
    <INCORRECTSET>

IncorrectSetTagEnd       = OpenAngle . Slash . IncorrectSetLabel . CloseAngle
    </INCORRECTSET>

AnswerSetAttrDef         = Attr*
```

FIG. 3E

Answer Definition

```
AnswerDef           = AnswerTagBegin . AnswerStatement . AnswerTagEnd
    <ANSWER ...>
        <STATEMENT ...>  ...  </STATEMENT>
    </ANSWER>
AnswerTagBegin      = OpenAngle . AnswerLabel . AnswerAttrDef . CloseAngle
    <ANSWER Attr='Val' ...>
AnswerTagEnd        = OpenAngle . Slash . AnswerLabel . CloseAngle
    </ANSWER>
AnswerAttrDef       = Attr*
```

Rule Definition

```
RuleDef             = (GroupDef | SelectDef | OrderDef | TimeLimitDef)
```

Rule Definition - Group

```
GroupDef            = GroupTagBegin . (QuestionName | GroupName)* . GroupTagEnd
    <GROUP ...>  ...  </GROUP>
GroupTagBegin       = OpenAngle . GroupLabel . GroupNameAttr . CloseAngle
    <GROUP NAME='Name'>
GroupTagEnd         = OpenAngle . Slash . GroupLabel . CloseAngle
    </GROUP>
```

FIG. 3F

Rule Definition - Select

```
SelectDef         = SelectTagBegin . (QuestionName | GroupName)* . SelectTagEnd
      <SELECT ...>  ...  </SELECT>
SelectTagBegin    = OpenAngle . SelectLabel . SelectAttrDef . CloseAngle
      <SELECT MIN='min' MAX='max'>
      <SELECT EXACT='exact'>
SelectTagEnd      = OpenAngle . Slash . SelectLabel . CloseAngle
      </SELECT>
SelectAttrDef     = (SelectMinAttr . SelectMaxAttr) | (SelectExactAttr)
SelectExactAttr   = ExactLabel . Equal . Value
SelectMinAttr     = MinLabel . Equal . Value
SelectMaxAttr     = MaxLabel . Equal . Value
```

Rule Definition – Order

```
OrderDef          = OrderTagBegin . (QuestionName | GroupName)* . OrderTagEnd
      <ORDER ...>  ...  </ORDER>
OrderTagBegin     = OpenAngle . OrderLabel . OrderAttrDef . CloseAngle
      <ORDER ...>
OrderTagEnd       = OpenAngle . Slash . OrderLabel . CloseAngle
      </ORDER>
OrderAttrDef      = Attr*
```

Rule Definition – TimeLimit

```
TimeLimitDef      = TimeLimitTagBegin . (QuestionName | GroupName)* . TimeLimitTagEnd
      <TIMELIMIT ...>  ...  </TIMELIMIT>
TimeLimitTagBegin = OpenAngle . TimeLimitLabel . TimeLimitAttrDef . CloseAngle
      <TIMELIMIT ...>
TimeLimitTagEnd   = OpenAngle . Slash . TimeLimitLabel . CloseAngle
      </TIMELIMIT>
TimeLimitAttrDef  = Attr*
```

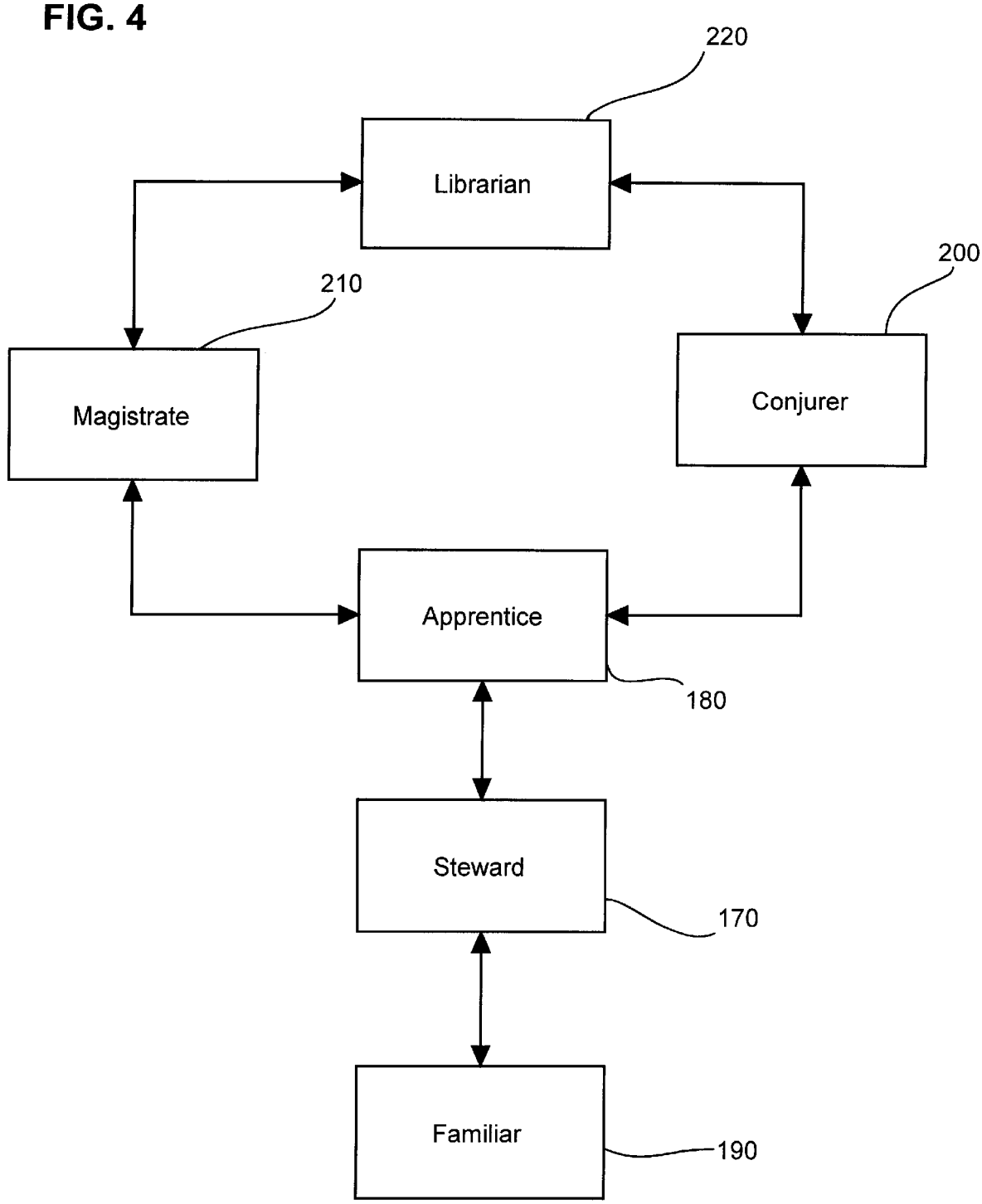

METHOD FOR DEVELOPING AND ADMINISTERING TESTS OVER A NETWORK

TECHNICAL FIELD

The subject invention relates generally to a method and apparatus for administering tests and, more particularly, to the development of such tests for, and administration of such tests over, a network.

BACKGROUND OF THE INVENTION

Tests are often used to evaluate and classify an individual's skill set, particularly in technical fields, for such purposes as employment, educational level ascertaimnent and professional standard requirements. Contemporary test design and interpretation is considered both an art and a science. A number of companies use agencies that administer multiple choice tests to determine technical proficiency and award professional proficiency certifications, such as the Microsoft Certified Systems Engineer and the Certified Novell Engineer.

Culturally and historically, standardized written and oral tests have provided a primary mechanism to judge one individual's knowledge and skills against another's. Recently, computers have provided a new medium for testing, and the Internet has expanded the forum for that medium immensely by eliminating geographical barriers facing test candidates and potentially reducing test administration costs for test requesters. Testing over the Internet permits a candidate to be physically located anywhere in the world and, so long as access to the Internet is provided, to take a test administered from a centralized location. The test results can be compiled, returned almost immediately and stored in a database if desired. Additionally, agencies interested in test results can use the same technology to obtain test scores quickly and select individuals that they may be interested in as employees, using the test results as an indicator of proficiency.

Providing a suitable and acceptable suite of tests for the various purposes listed above has proven challenging. In the technical community, clients relying on such test suites have done so on average with some degree of skepticism since the tests are often designed by people having no specific knowledge of the client's particular needs and the client has no way of altering the test to eliminate such concerns by either adding its own questions or making the test customizable through modularity. In addition, such tests are frequently aimed at gauging quantitative rather than qualitative knowledge. Another problem is that existing Internet testing systems concentrate so much on including specific content that they provide inflexible format and delivery options or relatively high cost tests of poor or ambiguous quality. Furthermore, in the absence of directly proctored test administration, the client has little assurance that steps are being undertaken to deter cheating.

On a test specific level, traditional testing methods frequently incorporate (operate based on) assumptions which lead to fallacious conclusions. For example, computer-graded tests are often comprised of a set of questions which are mathematically unordered and unrelated and delivered all at once to the test candidate. This arrangement does not account for the phenomenon of the "good test taker" who has a good short-term memory, is a good guesser, or is capable of interrelating information provided in otherwise unrelated questions, enabling that person to return to earlier questions in the set and change a prior answer to account for the new found knowledge. In order to properly test knowledge, test questions should be presented in a related, ordered sequence, and that sequence should not be identical for each test candidate.

A separate issue is raised when test responses are timed. On the one hand such timing information can assist test designers in eliminating bad or poorly worded questions and in comparing the knowledge level of test-taking candidates. On the other hand, if tests are administered over the Internet, there is no guarantee that each candidate's Internet connection will be at the same speed, thereby compromising data derived from response timing.

There exists, therefore, a need for a way to develop and administer tests over networks such as the Internet which overcomes the aforementioned problems.

SUMMARY OF THE INVENTION

The invention relates to a method for a test deliverer to develop at least one test examining a test candidate's level of knowledge of one or more fields and to administer such test(s) over a network on behalf of a client. The method involves receipt by the test deliverer of a request to create a test accompanied by a first set of rules. The test deliverer then develops pools of initial questions and answers and a second set of rules for the test and assembles a test definition from the aggregate pools of questions and answers and the first and second sets of rules. A test instance is generated from the test. Upon receipt of a request from a test candidate to take a test, this test instance is delivered to the test candidate and administered. The test instance is returned to the test deliverer along with the test candidate's answers and is graded. Grades are typically reported to the test candidate and to the client. The questions included in the test instance are then stored as data along with the answers provided by the test candidate and the known correct answers. This stored data is subjected to periodic statistical analysis, first, to assist in improving the quality of the test instances by eliminating "bad" questions and answers from availability for future use and, second, to create predictive psychological and job-related profiles of the test candidate based on comparisons with previous test candidates. The results of these profiles may be transmitted to the client.

The invention also relates to a method for a test deliverer to administer at least one test instance to a test candidate over a computer network by means of at least one content browser wherein both the test deliverer and the test candidate have access to a computer network. The invention further relates to a method for minimizing cheating on test instances administered to test candidate's over a computer network.

It is a primary objective of this invention to provide a method for creating tests of qualitative knowledge, administering them over a computer network, such as the public Internet, and grading them in a timely, fair, and efficient manner.

An additional objective of this invention is to provide a method for creating reliable, high-quality tests that are based on the application of mathematical principles of set theory and statistical analysis to a pool of possible questions.

A further objective of this invention is to provide a method that tests not only the qualitative knowledge of a test taker in a subject area, but through statistical analysis of the answers given in relationship with the results of other test takers over time, also provides a profile of the test taker with information and predictions regarding personality characteristics, the likelihood of cheating, probability of success in specific job types, and management ability.

It is still another objective of this invention to provide a test that may be administered over a computer network with a greatly reduced likelihood of successful cheating.

It is yet a further objective of this invention to provide a test creation method that is highly flexible, customizable and low cost.

Another objective of this invention is to provide test creation and delivery methods that produce an extremely large number of distinct tests from a relatively small number of questions and related possible answers.

BRIEF DESCRIPTION OF THE DRAWINGS

FIGS. 3A through 3F display the language grammar for the test definition language of this invention.

FIG. 4 is a block diagram of the software components comprising the test delivery architecture of this invention.

DESCRIPTION OF THE PREFERRED EMBODIMENT OF THE INVENTION

Figure 1:
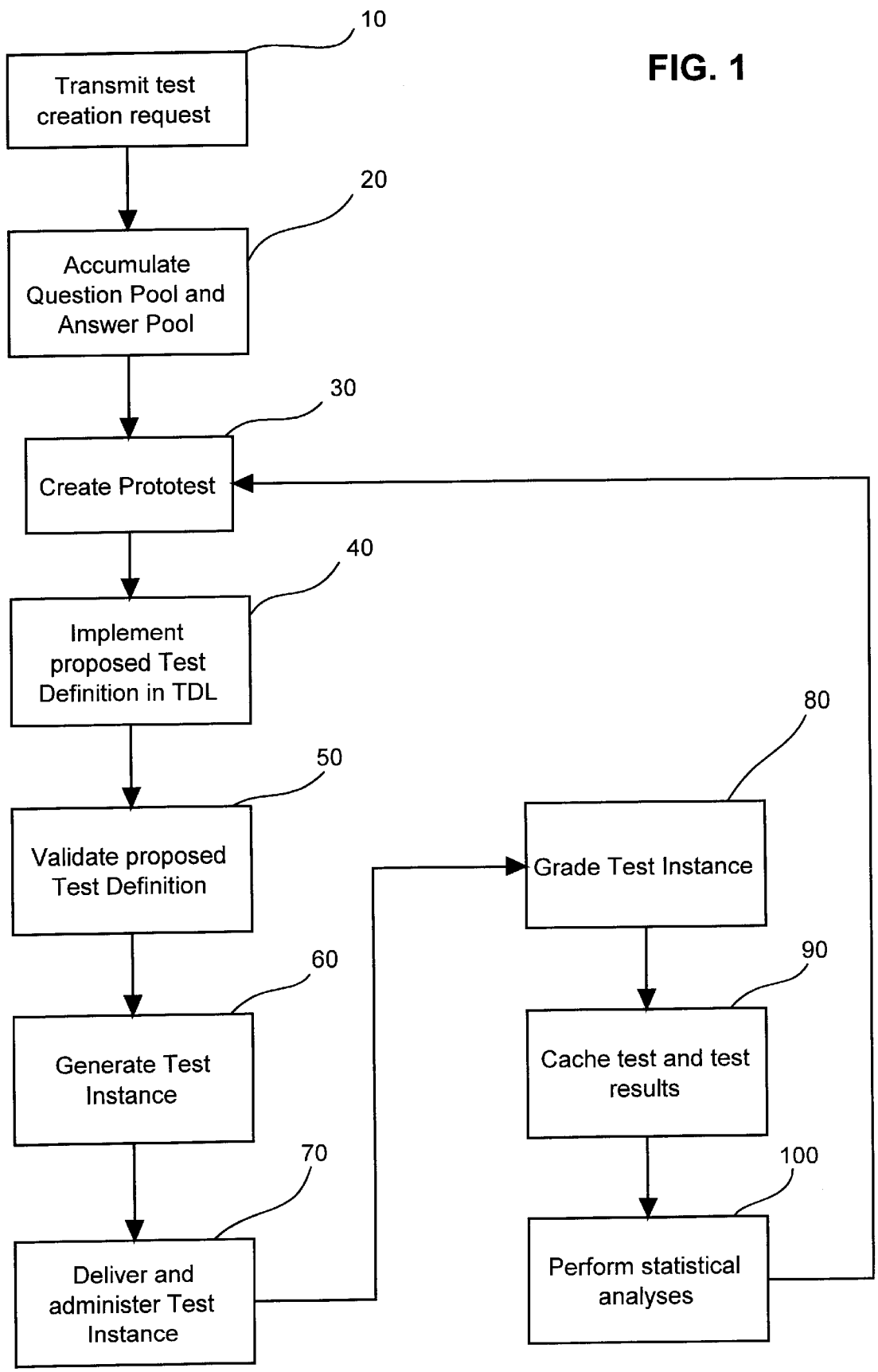
FIG. 1 a block diagram overview of the Test Lifecycle portion of this invention. It clarifies the nature and data flow of tests in the invention.

This invention comprises a unique method for developing tests based on the application of set theory and statistical principles to a pool of possible questions, and for administering such tests primarily over a network such as the public Internet. The following glossary of terms used throughout the description is presented as an introduction to terminology that clarifies the invention.

Glossary

Answer—A response to a question, designated with respect to the question as either correct or incorrect. A separate software-related definition applies for purposes of tags associated with the Test Definition Language.

Answer Pool—An arbitrary set (unordered collection) of answers. A subset of such a pool is usually used to define the Answer Set (and therefore its Correct and Incorrect subsets) for any given question.

Answer Set—A set of answers that are affiliated with a specific question.

Applet—A Software Component designed to provide a specific programmatic need as an extension to another software component, often a standard web browser in the preferred embodiment. Applets are currently most commonly written using the Java programming language (which is neither equivalent to nor related to JavaScript).

Apprentice—A Software Component in the Delivery Architecture designed to act as an intermediary between Steward and back—end Software Components, namely Conjurer and Magistrate. An Apprentice usually communicates with a Steward in a local, non-networked environment.

Client—Company or organization requesting or requiring delivery of a test.

Candidate—An entity (usually a person) taking an actual test instance. For convenience, candidates are often referred to as persons, although the structure herein does not require candidates to be persons. For example, an expert system or other Software Component may use a test to evaluate its capabilities. Furthermore, a Software Component that evaluates possible outcomes (predictive modeling) could use the invention and a suite of test definitions to answer questions that helped in its scenario evaluation by scoring sets of answers in a meaningful way to the Component. Note also that a candidate may actually refer to a team or group of individuals who are validly taking a test in a cooperative (and therefore non—cheating) manner, such as in military strategy analysis.

Candidate Answer Set—The set of answers (in relation to the appropriate questions) chosen by the candidate.

Completed Test Instance—A Test Instance with a Candidate Answer Set.

Conjurer—A back-end Software Component in the Delivery Architecture that generates Test Instances from Test Definitions upon (authenticated) request. Conjurer communicates directly with a Librarian and an Apprentice. A Conjurer is directly responsible for storing grading data to a Librarian for use by a Magistrate after a Test Instance is completed. Conjurer reads a Test Definition to produce a valid Test Instance from that Test Definition.

Content Browser—A Software Component, such as a Web Browser, which is intended to display content, possibly of multiple content types, such as graphics and text. (Older browsers were text-only.)

Content Server—A Software Component, such as a Web Server, which is capable of delivering content to some other Software Component, usually over a network.

Cooperative Cheating—Two candidates interacting to complete a test in a way that assists at least one candidate in an unauthorized way.

Correct Answer Set—That subset of a specific question's answer set that is considered correct with respect to the question.

Delivery Architecture—The interconnected Software Components of the invention that comprise the effective delivery cycle of a test, from initial request by a candidate, to delivery of the test, to return of a completed test for grading. The components involved in the Delivery Architecture are Librarian, Conjurer, Apprentice, Steward, Familiar, and Magistrate.

Delivery Cycle—The sequence of events invoked by the proper functioning of the Delivery Architecture, namely that of Candidate request for a test, delivery of a Test Instance, completion and submission of a Test Instance, and grading of a Completed Test Instance.

Familiar—A Software Component in the Delivery Architecture designed to deliver a Test Instance directly to a Candidate. Familiar must usually be a, or use some sort of, Content Browser. The Familiar provides test administration and restriction functions to the delivery of a Test Instance to a Candidate, based in part on the Test Definition underlying the Test Instance being delivered. For example, a Familiar could be implemented as a Java applet to a Web Browser. It could also be implemented as a specialized Web Browser itself. Among many possible Familiars, a Steward is responsible for choosing which to use. Familiar takes a Test Instance and provides a user interface for a Candidate to take a test, then returns a Completed Test Instance back to a Steward.

Graded Test Instance—The result of a Magistrate processing a Completed Test Instance, essentially a Completed Test Instance and an evaluation of some sort, usually involving a numeric qualifier ("34 of 45 questions answered correctly," for example).

Group—A collection of named entities (questions, answers or other groups) aggregated under a single name.

Grouping (Rule)—A type of Rule applied to a set of questions, wherein the questions are aggregated under a common name. The value of Grouping Rules is in their application with Selection Rules and Ordering Rules. A Grouping rule defines a Group.

Incorrect Answer Set—That subset of a specific question's answer set of which all members are considered incorrect with respect to the question.

Internet Service Provider (ISP)—Any entity that provides a computer or network of computers access to the Internet (including Erols, UUNET, etc.).

Librarian—A Software Component of the Delivery Architecture designed to store and retrieve data for Test Definitions, Test Instances and their Candidates, grading, statistical analysis, and any other data relevant to the invention. Librarian communicates directly with a Conjurer and a Magistrate. References made in the style of " . . . store to Librarian . . . " indicate that the "storing" Component is submitting data to a Librarian for storage, and that Librarian is expected to subsequently store the data.

Magistrate—A Software Component of the Delivery Architecture designed to evaluate or grade Completed Test Instances. A Magistrate communicates with a Librarian and an Apprentice. Magistrate takes a Completed Test Instance and produces a Graded Test Instance (effectively a grade or evaluation of the Candidate's work).

Network—Two or more computers capable of intercommunication.

Network Access Point (NAP)—Any entity (such as an Internet Service Provider) that provides connectivity to a network or internetwork (such as the public Internet).

Non—cooperative Cheating—Any attempt by a Candidate to answer questions in an unauthorized way that does not qualify as Cooperative Cheating.

Ordering (Rule)—A type of rule applied to an ordered list of questions. Ordering requires that questions appear on the test in the order given by the ordering rule. Note that if Question A is to appear before Question B, as defined by an Ordering rule, neither question is required to appear on any given Test Instance. But if both do appear, A must precede B. Further, the distance between them is irrelevant. Any number of questions (0 or more) may appear between them.

Prototest—A set of questions, fully defined with answer sets (each containing defined answers), and a set of Rules applied to it. Note that a Prototest is the information, unformatted, that leads to a Test Definition in some formal expression (namely, in most cases herein, a TDL). A Prototest is often generated by a team of experts in the knowledge area of the test to be defined, either on paper or other conventional medium.

Question—An interrogative or imperative designed, along with an answer set, to evaluate a candidate's knowledge of a very specific subject area (the area covered by the specific question only). A separate software-related definition applies for purposes of tags associated with a Test Definition Language.

Question Pool—An arbitrary set of questions. A question pool usually has a set of rules applied to it (questions that may be asked and restrictions as to how many of which sets may or must be asked) to assist in creating a test definition.

Rule—Application of a mathematical relation between or among questions (or answers) to provide a structured context for a test. In short, a Rule defines a relationship between or among questions, or between or among answers.

Grouping, Selection, Ordering, and Timing are the types of Rules currently provided in TDL.

Sage—A Software Component tool intended to analyze a Test Definition for syntactic and semantic validity. Sage acts in a similar way to any language validator, such as a compiler, in that it checks for valid syntax. Sage also provides some degree of mathematical analysis of a Test Definition, in that it can provide bounds (possibly an exact number) for the number of Test Instances that a given Test Definition can produce. The Sage reads a Test Definition and makes no modifications to it. Sage's only output is analytical.

Scribe—A Software Component tool intended as a data processing and formatting tool to assist test developers in generating test definitions. Scribe writes data in a Test Definition Language. Its input is user-controlled, and output is TDL data.

Selection (Rule)—A type of Rule applied to questions that dictates how many questions from a given Group should be provided on every Test Instance of the Test Definition to which the Rule applies. Selection can dictate a minimum and maximum number of questions that should appear from a specified Group or Groups (implicit or explicit), or an exact number.

Sequence—An ordered collection.

Set—An unordered collection.

Software Component—Code and data in a computing environment designed to perform a task or set of tasks. Sometimes abbreviated as simply "Component."

Steward—A Software Component in the Delivery Architecture that is directly responsible for ensuring that a Candidate uses a valid Familiar Component for a specific Test Instance. For example, a Steward could be implemented with a typical web server. Steward communicates directly with an Apprentice, usually in a local, non-networked computing environment.

SWAT—An acronym for Socrates Web-enabled Analytical Test engine, which designates the overall process and system for creating and delivering tests of this invention.

Test—A sequence of questions delivered to a Candidate to evaluate knowledge or skill in one or more subject areas. A test is a logical entity abstraction, implemented as a Test Definition used to generate Test Instances. A separate software-related definition applies for purposes of tags associated with a Test Definition Language.

Test Definition—The result of formal application of Rules to a Question Pool and to the associated Answer Pool. Note that Answers and Answer Sets are inherent in the definitions of Questions themselves. A Test Definition is implemented using a Test Definition Language. Note that once a Test Definition is created, it is considered immutable, and its Test Definition Identifier is considered to identify this immutable Test Definition. Changes desired to a Test Definition result in a new Test Definition with a new corresponding identifier.

Test Definition Identifier (ID)—The name or identifier, unique in the set of all Test Definition Identifiers within a SWAT system, given to a specific Test Definition.

Test Definition Language (TDL)—A high-level computer language designed to implement and express the qualities and characteristics of a Test Definition. A TDL applies its own software—related definitions of Test, Question, and Answer.

Test Deliverer—A legal entity (a company or person, not a Software Component) that is responsible for a SWAT engine and its content.

Test Instance—A specific sequence of Questions with Answer Sets that conform to a specific Test Definition, and is delivered to a Candidate to evaluate their proficiency or knowledge in a given subject area.

Test Instance Unique Identifier (ID)—The name or identifier, unique in the set of all Test Instance Unique Identifiers within a SWAT system, given to a specific Test Instance, used to track its progress, link to the data in the Test Instance, and often bound to a Candidate in some way to track grading information for the Candidate.

Test Lifecycle—The analysis of the evolution of a test from raw knowledge through a Test Definition, to Test Instance and on to Completed Test Instance and Graded Test Instance. The Test Lifecycle involves the Scribe and Sage Software Components in addition to Conjurer, Familiar, and Magistrate.

Test Request Identifier (ID)—The name or identifier, unique in the set of all Test Request Identifiers within a SWAT system, given to a specific test request available to a Client. The Test Request Identifier indicates to the back-end system which Test Definition Identifier to use when generating a Test Instance based on the Test Request Identifier. Though a Test Request Identifier may not change over time (for example, in a request for a Java Fundamentals test), the Test Definition Identifier used may change over time to allow improvements to the Test Instances delivered to Candidates. Note again that Test Definitions (and therefore their bound Identifiers) are considered immutable.

Test Section—A convenient way of designating a group of questions on a test that are considered to have a common subject area (e.g. an arithmetic section of a mathematics test). It is effectively a Grouping rule applied for reasons of content similarity.

Time Limit (Rule)—A type of Rule applied to Questions, and Tests that limits the amount of time that a Candidate may spend on the Question or Test. This Rule must be implemented and executed during the Delivery Cycle.

Trusted Network—A network on which the data is believed to readable and writable only by the Test Deliverer.

Untrusted Network—A network on which the data is not believed to be entirely under the control of the Test Deliverer; typically any public network.

Web Browser—A Content Server designed to use hypertext transfer protocol (HTTP).

Web Server—A software application that provides industry—standard HTTP service over a computer network.

For a better understanding of the invention, reference is now made to FIG. 1 of the drawings. This figure presents an overview in block form of the Test Lifecycle of this invention. A Client, such as a an employment agency desiring to examine the skills of its applicants (Candidates), transmits a request to a Test Deliverer at block 10 to create a test for one or more specified subject areas. Such a request may also be generated internally by the Test Deliverer to augment its collection of available tests. Upon receipt of such a request, the Test Deliverer accumulates at block 20 a Question Pool and an associated Answer Pool. The Question Pool and Answer Pool are raw collections of Questions and Answers, respectively, with no Rules applied, and therefore no way to actually generate a test. Note that in practice, some Questions and Answers may already exist in the Test Deliverer's global pool (all questions and answers ever drawn together by the Test Deliverer), and accumulating a Question Pool and Answer Pool may involve collecting questions and answers that already exist, as well as creating new ones.

Then a Prototest is created by a committee of experts at block 30 by applying Rules to the Question Pool. These Rules are derived in part from information contained in the Client's test creation request and otherwise from Rules developed by the committee of experts. For example, the first two Rules of any Test Definition are typically a Grouping Rule that collects all the questions that are considered valid on the test, and a Selection Rule that defines how many questions should appear on any Test Instance derived from the Test Definition.

Usually with the help of a Scribe Software Component, a Prototest is then expressed formally in a Test Definition Language (TDL) at block 40 as a proposed Test Definition. This Software Component provides an interface for Test Definitions, much like a word processor provides an interface for natural language text. Its use is not absolutely necessary during this TDL-expression stage, but hides the details of TDL and allows the user to concentrate more on the information and rules than on the format.

At this point, the proposed Test Definition is considered complete, and potentially ready for use in actual Test Instance generation. However, before actual use, the syntax and semantic validity of the Test Definition must typically be analyzed and verified. This function is performed by a Sage Software Component at block 50.

After a Test Definition is created, the Test Deliverer makes it available to Clients for use by Candidates. At some point thereafter, another Software Component (a Conjurer) uses the finally accepted Test Definition to generate one or more Test Instances at block 60. The resultant Test Instance is delivered and administered to a Test Candidate, usually over a network, at block 70.

Upon completion, a Completed Test Instance is returned to the Test Deliverer, usually over a network, for grading at block 80, resulting in a Graded Test Instance. The grade may be reported to the Client and Test Candidate. Then the Test Candidate's test and answers are stored at block 90 and subjected to statistical analysis by the Test Deliverer at block 100. This statistical analysis is useful both to improve test quality by eliminating bad or poorly worded questions and provide statistically meaningful data concerning various related parameters of the Test Candidate (such as transcript data, salary, locale, and other data not directly related to the subject matter of the test), which may be transmitted to the Client. Analysis of test results is therefore used in creating and modifying Prototests.

I. Test Creation

Figure 2:
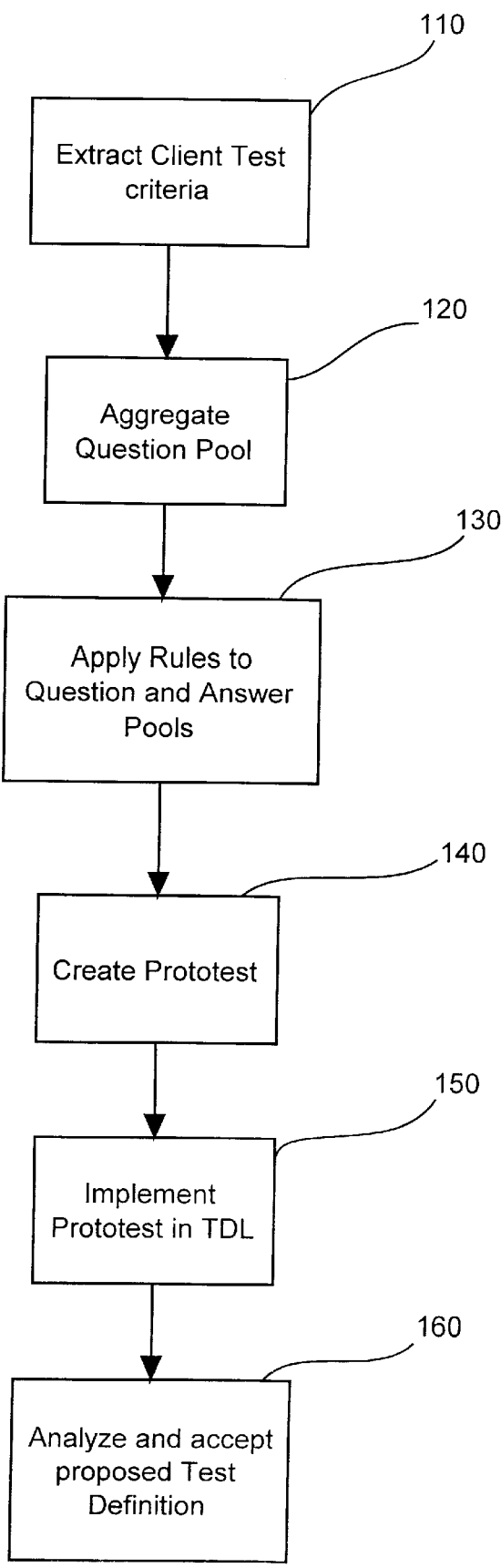
FIG. 2 is a block diagram of the Delivery Architecture, for carrying out the data processing and operational methods according to the preferred embodiment of this invention.

Reference is now made to FIG. 2, which depicts a flowchart of the process of creating the Test Definition. Once a test creation request from block 10 has been received from a Client for a particular subject area, it is reviewed to extract the Client criteria for the requested new test at block 110. Such criteria may include, but are not limited to: the subject matter area or areas to be tested; the number of questions permitted or required for the test (in a Test Instance); the amount of time allotted for completion of the entire test, parts of the test, or individual questions within the test; and whether questions should be selected at the beginning of the test or in an adaptive manner as the test progresses. These criteria constitute a first set of rules used in producing a Prototest, as explained in greater detail below. A request may also be generated in—house by the Test Deliverer without having received an external Client test creation request (i.e., the Test Deliverer may function as Client for certain tests).

Upon receipt of a request to create a test, the Test Deliverer forms a committee of experts who are ultimately responsible for creating an applicable Test Definition. In the first stage of the process, questions relevant to the subject matter of the test are collected into a Question Pool at block 120. This pool may come from one or more of three sources: new questions created by the Test Deliverer, questions provided by the Client, and preexisting questions stored by the Test Deliverer.

In the first instance, a committee of two or more experts is chosen to create content, one of whom is designated the committee leader. The committee divides the knowledge area into discrete Test Sections and decides the total number of questions per Test Section that should be delivered to a Candidate in a Test Instance. When deciding Test Section size, the committee must keep in mind how the test will be graded (e.g., one composite grade, several section grades, etc.). For small tests, the typical Test Section size is usually too small to allow any judgement on the Candidate's performance in the Test Section alone.

The test creation committee then determines the number of questions that should be available in the Test Definition for each Test Section (at least twice the number of questions that will be delivered per Test Section). After prospective questions are created, forming an initial Question Pool, the committee deletes those it considers unacceptable, suggests replacement questions, and may revise the selection criteria of the questions and the answers. The committee's members then create alternative phrasings for each question statement (possibly with inverted meaning, inverting the role of Correct and Incorrect Answer Sets). Multiple question statements greatly increase the number of permutations of Test Instances.

Next, an initial Answer Pool is created, comprised of answers applicable to the subject area being tested. From this Answer Pool, an Answer Set, typically consisting of several correct and several incorrect answers, is created for each question. Note that in relation to an inverted statement of a question, the values of answers also invert, making answers that were correct for the original statement incorrect, and vice versa. If inverted question statements are allowed, it is usually important to keep the sizes of the Correct and Incorrect Answer Sets nearly or exactly equal, so that inverted statements do not suffer a dearth of incorrect answers to choose from (answers that were correct for the original question statement).

Typically, though this is not a requirement, one correct answer is ultimately chosen from each question's Correct Answer Set and several (three to five) incorrect answers are selected from the question's Incorrect Answer Set for display to a Test Candidate as part of a Test Instance. The committee collates and reviews the resultant Question and Answer Pools. Changes and revisions are applied as necessary to create a Question Pool and Answer Pool that satisfy the committee as a whole. During this process, the committee also formulates a second set of Rules unique to the particular Test Definition comprised of Grouping, Selection and, if needed, Ordering Rules.

In the second stage of creation of the Test Definition, the committee, as necessary, evaluates the Question and Answer Pools and, at block 130, applies both the first set of Rules and the second set of Rules to the initial Question Pool to arrive at a final Question Pool and a final Answer Pool. The primary pair of Rules from the second set of Rules that always must be applied to formulate a Test Definition include a Grouping Rule that names all the questions available to the test under a global test group (usually the name of the test), and a Selection Rule that applies to the global test group and defines how many questions appear on the test. Application of these two sets of Rules leads to creation of a Prototest.

A Grouping Rule aggregates a set of questions or other Groups under a single Group name for use by Selection and Ordering Rules. Since Test Sections are implemented by Grouping Rules, the division by the committee of the knowledge area into discrete categories represents a practical initial application of the Grouping Rule.

A Selection Rule treats groups transparently, in that if it is applied to multiple groups or a group including groups, it treats the selection as applying to a single aggregate group including all members of all groups to which the Rule applies. In mathematical terms, Selection applies to the set union of the Groups named in the Rule, recursively defined on Groups of Groups. All members of all identifiable Groups in the Selection Rule are considered members of a single target Group that the Selection Rule affects. A Selection Rule defines how many members of the target set may (maximum) or must (minimum) appear on a test. For convenience, the TDL includes a way of specifying that the two values are equal, and such a Selection Rule merely defines an exact number of questions that must appear. The size of a Test Section also plays a role in determining the Selection Rules that apply to Question Pools, since a Selection rule implements the size requirement of a Test Section. A Selection Rule is easily implemented with the min/max version of the rule wherein the two values are equivalent. Furthermore, exclusion rules are easily implemented with a Selection Rule that selects either exactly one or at most one question from the target set.

An Ordering Rule applies to a list of questions or group names, and specifies that the order of questions appearing on a test is bound by the order specified. For example, an Ordering Rule that specifies ABC indicates that A must precede both B and C, and B must precede C. If B does not appear on the test, but A and C do, A must still precede C. For Ordering Rule interpretation, any number of questions (zero or more) may appear between two ordered questions. Referring again to the ABC Ordering Rule above, a valid question order would be ADFBEC, ABFC, or AGEC, but not CABG (because A must precede both B and C, and in this example does not precede C).

Unlike Selection, if an Ordering of names includes a group name, the Rule does not extract all the members, since they neither have nor need any implicit order. However, all members are bound to the position defined by the Ordering Rule as if the group name were their own. For example, assume a group Z has been defined with member questions FGH, and A and C are also questions. If an Ordering defines AZC, A must clearly precede C; in addition, A must precede F, G, and H, each of which must in turn precede C. There is no Ordering applied to F, G, and H with respect to each other, however. Ordering groups is one way to order sections on a test, and is a valid and useful mechanism for just such an operation.

A Time Limit Rule specifies a bounded time (usually an upper limit) that a Candidate may spend on a Question or Test. For example, a timed test may define a Rule that limits each Candidate to 30 minutes for all Test Instances generated by the test's Test Definition. Each question on every such Test Instance (say there are 20 questions) may be limited to 2 minutes each. The implementation of such Time Limit Rules occurs in the Test Delivery Cycle.

The completion of the process performed at block 130 results in the creation of a Prototest at block 140. This Prototest is then implemented at block 150 in a Test Definition Language (TDL) as a proposed formal Test Definition for use by the Test Delivery Architecture.

However, before being finally accepted as a Test Definition used in a Test Delivery Cycle, the Test Definition is usually subjected to validation analysis at block 160 to determine whether its syntax and semantics are valid. This function is performed by the age Software Component. In addition, this Component provides bounded values of how many valid, different Test Instances can be created from any given Test Definition, since at least one and usually a specified minimum number of different Test Instances must be available to discourage cheating, as explained below, and provide test design flexibility, as well as to provide a statistically significant sampling upon which to base conclusions concerning particular test questions and characteristics of Candidates in which the Client may be interested. The number of Test Instances possible, even for a small test with several restrictive rules, can be quite vast. One example of a relatively small test (20 questions per Test Instance with 40 questions defined in the Test Definition), with few typical rules (grouping and selection as test sections or subdivisions of knowledge areas, say up to five sections) results in a number of Test Instances on the order of $10^{12}$, thousands of billions of tests.

Assuming roughly 1000 tests of a specific subject (representing one Test Definition) are delivered per month, it is reasonable to expect about 10,000 Test Instances minimum from the Test Definition, to greatly reduce the probability of any two Test Instances looking very similar. Since the number provided above is significantly higher than 10,000 ($10^4$), such a Test Definition with thousands of billions of possible Test Instances would be appropriate for a significantly higher load than 1000 a month, or 12,000 a year. For most tests defined in even more rigorous manner (more Rules that cause the Test Definition to produce fewer tests), the resultant number will still, in most cases, be more than sufficient to produce an ample variety of Test Instances to discourage cheating. Also, with an increased question and answer pool, the numbers explode astronomically. By increasing the number of questions in a pool, the exponent of the number of Test Instances increases significantly. By doubling the question pool to 80 for a 20 question test, we see on the order of $10^{20}$ Test Instances precipitate, and with 160 questions in a pool for a 20 question test, on the order of $10^{25}$ Test Instances.

From the Test Definition, Test Instances are created, and the Test Lifecycle follows the path of each individual Test Instance. Assuming the results of the analysis performed at block 160 fall within acceptable parameters, the proposed Test Definition is finally accepted for use in producing actual Test Instances.

The answers selected for each question on a given Test Instance by each Candidate are subjected to parametric nonlinear and other statistical analysis to determine whether any questions, answers, or combinations of questions and answers should be removed from the test, or whether new restrictive rules should be added. For instance, if performance on a particular question does not correlate with high performance on the test, or if a particular correct or incorrect answer is causing undue confusion, statistical analysis identifies the problem and justifies removal of the anomalous item. The reliability of the test and its results will increase over time as additional data on Candidates is collected and statistically analyzed. This analysis occurs based on the composite of all results of all Test Instances for a given Test Definition. As this population increases, it will be possible to perform predictive analysis. Parametric, nonlinear statistical analysis using a neural network approach is used for this statistical analysis.

As an alternative to the sequence described above, the Client may desire to create content for inclusion in the test (or comprising the entire test). In this circumstance, the Scribe Software Component can be provided to the Client to guide it through steps analogous to those taken by the committee, described above, to develop questions and answers. As these questions and answers are used over time, statistical result analysis (as partially described above and further described below) may be applied to refine the test and discard "bad" questions and answers.

As noted initially, a Question Pool and Answer Pool may preexist as part of the Test Deliverer's repository of questions and answers, usually based on the Test Deliverer's own prior development work or material submitted previously by Clients. The high quality of these pools is guaranteed to the greatest possible extent, since they are likely to have been subjected both to substantial review by subject area experts as well as to statistical analysis after repeated actual test presentation to Test Candidates as described below. In this situation, the Client can access preexisting repositories of questions and answers maintained by the Test Deliverer to decide whether to mandate that those sections or some questions derived from those sections be included in the test and, if desired, at what point in a Test Instance they should appear. The ability of the client to conveniently determine partial or full test content provides previously unavailable format flexibility as well as the option to customize a new test from existing material. Regardless of the method used, the result of application of the above process is creation of a completed Test Definition consisting of Questions, Answers, and Rules.

To express a Test Definition, a Test Definition Language (TDL) was developed as part of this invention. This new language offers both a set of features common to modern multiple choice testing as well as providing the ability to flexibly define constraints on a test for such purposes as test question grouping or exclusion (e.g., ask at least two of this group of four, or ask only one of another group of seven), ensuring one question always precedes another (e.g., if the answer to one question appears in the question body of another), and timing the test (e.g., thirty minutes per section maximum on each of three sections). For practical implementations, TDL also provides the ability to assign multimedia objects (e.g., static graphics, video, audio) to question and answer statements, as well as the possibility of incorporating program material (e.g. interactive simulation test material), possibly applets, into a Test Definition (in a very XML-like way). TDL adopts a format similar to tag—based markup languages such as HTML and XML and can easily be made compliant with the latter, as well as other SGML—based languages. As the Test Definition is primarily composed of relatively few tags, it is certainly much simpler than many SGML subsets. TDL is not case—sensitive for tag names or attributes, but attribute values and information between tags are case-sensitive.

The language grammar describing the major productions for a TDL appears in FIGS. 3A through 3F. The convenient programming practice of writing attributes as concatenated capitalized words appears through the language grammar. Grammar productions are mathematical rules that define the structural validity of any expression in a language (e.g. common grammar rules for sentences in English may often be expressed as a fairly rigorous and complex set of grammar productions).

II. Test Delivery Architecture

The Delivery Architecture required to carry out the method of this invention is comprised of six Software Components as shown in FIG. 4. The Delivery Architecture can be divided cleanly into front—end and back—end Component collections, with a gateway between the two.

The front—end is the Client Component view in which test requests are created, Test Instances are delivered, and Completed Tests are submitted to the back-end. The back-end is the Test Deliverer Component view in which requests and submissions are processed, Test Instance generation and grading occurs, and all the data for Test Definitions, Graded Test Instances, and other testing data is stored.

The first point of interest in analyzing the Delivery Architecture is the Steward Software Component 170, which is responsible for maintaining a connection with any Network from which Candidates may request tests and over which Candidates may receive and take tests. Steward 170 provides a user interface to request tests to Candidates that it allows to take tests. A Candidate requests a test by means of the user interface of Steward 170, invoking the Delivery Cycle. The Candidate transmits a test request as a Test Request Identifier to Steward 170.

Steward 170 then negotiates with Apprentice 180 as a Client (as if having a Power of Attorney in the computer world for the real-world Client) for delivery of a Test Instance of a specific Test Definition. Steward 170 asks for a specific Test Identification (ID), for example, a programming fundamentals test, which relates to a specific Test Definition. Note that when the Test Deliverer changes a Test Definition to update it, the request Test ID remains the same. As far as the Client (or Steward 170) is concerned, the programming fundamentals test is upgraded, not new.

Apprentice 180 responds in time with a Test Instance and a Test Instance Unique Identifier (UID), and an appropriate Familiar 190, either by name or actual Component. With a Test Instance, UID, and appropriate Familiar 190, Steward 170 has all the tools it needs to deliver the Test Instance to the Candidate immediately.

Steward 170 responds to the Candidate with the two pieces of data (Test Instance and UID) and the appropriate Familiar 190 to deliver the Test Instance to the Candidate. Familiar 190 then administers the Test Instance according to any delivery restrictions applied to the test (including timing constraints, adaptive testing algorithms, etc.). When the test is complete (either because of exceeding time constraints, meeting a failing or passing condition implicitly, having completed all the questions, or any other appropriate test completion condition), Familiar 190 collects all of the Candidate's responses and sends them back to Steward 170 with the UID. This constitutes submission of a Completed Test Instance.

Steward 170 then passes the same data to Apprentice 180. At this point, the frontend portion (Client and Candidate view) of the Delivery Cycle is complete.

On the back-end, Apprentice 180 negotiates with Conjurer 200 and Magistrate 210, each of which in turn negotiates with Librarian 220. The interactions on the back-end vary in implementation, but the concepts that follow define the basic operations.

The relationship between Conjurer 200 and Apprentice 180 is simply that Conjurer 200 generates tests, and delivers them to Apprentice 180 on request by Apprentice 180. Conjurer 200 must also provide Apprentice 180 with an appropriate Familiar 190 for each Test Instance generated.

In one example, every time Apprentice 180 requests a test from Conjurer 200, Conjurer 200 generates a test from the appropriate Test Definition and passes it back to Apprentice 180 with a Test Instance Unique Identifier (UID) the name of the Familiar 190 to use. Apprentice 180 in this example keeps an inventory of all the valid Familiars 190 that it can use locally to pass to Steward 170 when appropriate. Whenever a new Familiar 190 is necessary in this example, the Test Deliverer manually places it within access of Apprentice 180 and adds the Familiar's name to appropriate lists in Conjurer 200, associating one Familiar 190 with each Test Definition.

Continuing with the previous example, for each Completed Test submission from Steward 170, Apprentice 180 forwards the submission to Magistrate 210 for grading. Magistrate 210, like Conjurer 200, typically authenticates submissions from Apprentice 180. The reason for this is that in this example, Apprentice 180 resides over an untrusted network away from Conjurer 200 and Apprentice 180.

When Conjurer 200 begins to generate a Test Instance, continuing with the example, Conjurer 200 requests a full Test Definition, as indicated by the specified Test Request ID, from Librarian 220. Conjurer 200 then generates a Test Instance based on the Test Definition, along with a Test Instance Unique Identifier (UID). The UID is a unique name associated with a specific Test Instance, and is necessary to keep track of each Instance throughout the Delivery Cycle. Along with the Test Instance, Conjurer 200 generates grading information and stores the Test Instance, its grading information, and the UID back to Librarian 220.

Continuing the example, the grading information stored by Conjurer 200 is used by Magistrate 210, and in statistical analysis later. When a Completed Test Instance and its associated UID are received by Magistrate 210, Magistrate 210 requests from Librarian 220 the grading information associated with the UID (stored at generation time by Conjurer 200), and then grades the test, storing the Graded Test Instance back to Librarian 220. In a typical implementation such as this example, Librarian 220 is on a trusted network or is implemented on the same computer as Conjurer 200 and Magistrate 210, and therefore may require no authentication.

In summary of the preceding example, every test request (as a Test Request ID) from a Candidate comes through Steward 170, which provides a user interface for such tasks. Steward 170 negotiates with Apprentice 180 for a Test Instance (and associated Test Instance Unique ID) of the test requested. Apprentice 180 responds (possibly after back-end negotiations with Conjurer 200) with a Test Instance, Test Instance Unique ID (UID), and Familiar 190, which Steward 170 packages and delivers to the Candidate. Familiar 190 administers the test, and upon completion, submits the Completed Test Instance back to Steward 170, which forwards the information to Apprentice 180, completing the front-end Delivery Cycle.

Continuing the summary of the preceding example, to fulfill the test request of Steward 170, at some time, Apprentice 180 must request a Test Instance (or a set of Test Instances, for efficiency) from Conjurer 200. To fulfill such orders, Conjurer 200 must at some point identify the appropriate Test Definition and request it from Librarian 220, generate a Test Instance, UID, and grading information, and store all those back to Librarian 220. Conjurer 200 sends a Test Instance, UID, and an appropriate Familiar (or its name) back to Apprentice 180, for each request that Apprentice 180 makes of Conjurer 200 for a Test Instance.

Each submission in the example (Completed Test Instance and UID) made by Apprentice 180 to Magistrate 210 invokes, at some point, a call by Magistrate 210 to Librarian 220 for grading information based on the UID. Magistrate 210 takes the response of Librarian 220 (grading information) and grades the Completed Test Instance, creating a Graded Test Instance. Magistrate 210 sends Graded Test Instance to Librarian 220, which stores it.

III. Example Test Delivery Architecture Implementation

Figure 5:
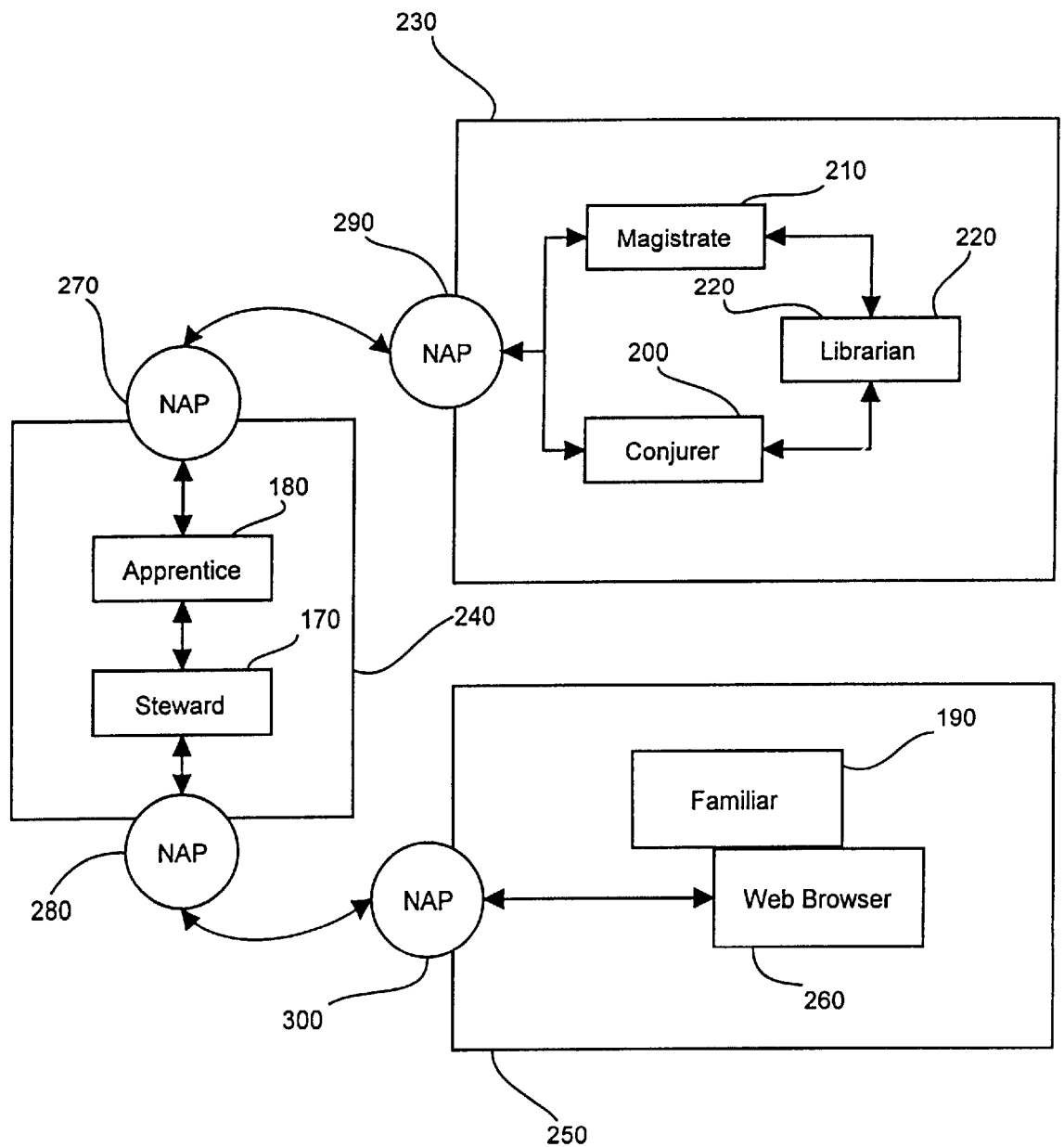
FIG. 5 is an example in block diagram form of a specific implementation of the test delivery architecture of this invention.

An example of a specific implementation of the Test Delivery Architecture of this invention is provided in FIG. 5 in which Steward 170 is a Web Server capable of providing test choices to Candidates and negotiating with Apprentice 180. Note that this example is merely one choice for implementation, and the Delivery Architecture is by no means limited by the choices shown in FIG. 5.

The Software Component Delivery Architecture shown in FIG. 5 is almost identical to that of FIG. 4, except that the Software Components have been grouped to illustrate a hardware-specific implementation and one additional Component has been added, namely Web Browser 260. Librarian 220, Conjurer 200, and Magistrate 210 all reside on Test Content Server 230, a computer hardware server that supports the functions of all three Components. For the purposes of this example implementation, the Test Content Server 230 hardware used has a dual-Pentium II processor set running at 300 MHz with a 100 MHz I/O bus, two 9 GB hard drives that are used in a mirror set for fault tolerance, a 100 baseT Ethernet card connected to a 100 baseT Ethernet LAN, 256 MB of standard main memory, a 512 KB primary memory cache, uninterruptable power supply (UPS), a 16X CD-ROM drive, 3.5" floppy drive, and a typical 17" color monitor. In addition, this example system will run Windows NT 4.0 Server with Service Pack 4 with SQL Server 7.0. Assume that Client Server uses the same hardware installed with Windows NT 4.0 Server and Apache for NT web server software. Apprentice 180 and Steward 170 both reside on Client Server 240, while Candidate computer 250 hosts Familiar 190 and Candidate Web Browser 260.

Note the addition of Candidate Web Browser 260, which is a Content Browser designed to handle HTTP (hypertext transfer protocol) communications with a Web Server.

Steward 170 is implemented as a Web Server (the Apache for NT web server referred to above), with Common Gateway Interface (CGI) scripts that implement communications with Apprentice 180. Apprentice 180 is a process that resides on the Client Server and can communicate over a network through network access point (NAP) 270. A second NAP 280 is also associated with Client Server 240 but is distinguished from NAP 270 since NAP 280 is considered to be an interface with a different network.

This implementation can be interpreted as a Client Server 240 whose Web Server (Steward 170) serves the public Internet via network access point 280, and communicates with a local area network (LAN) via NAP 270. The Test Content Server 230 is shown to operate on the LAN through NAP 290 which shares a network with NAP 270, allowing them to communicate. The Client Server 240 Internet connection, NAP 280, shares a network (the publicly routed Internet) with NAP 300 of the Candidate Computer 300, allowing them to communicate.

The Delivery Cycle in this example implementation starts with a request from the Candidate Computer's Web Browser 260 to the Steward 170 (web server) for a test. Steward 170 interprets the request and passes a Client ID and password for authentication, along with the Test Request ID to Apprentice 180. Apprentice 180 connects (via NAP 270 and then NAP 290) to Test Content Server 280, requesting Conjurer 200, a stand-alone software service, for a Test Instance from the Test Definition implied by the Test Request ID given.

Conjurer 200 authenticates the request, determines the correct Test Definition, and requests it from Librarian 220, a database service using ODBC (Open Database Connectivity standard) running on Test Content Server 230. Librarian 220 fulfills the request and responds with the data. Conjurer 200 runs a generation algorithm that creates a valid Test Instance and a grading scheme, along with a unique name (UID), and selects a Familiar to use from a list of valid Familiars it knows are available to Apprentice 180 on Client Server 240. Conjurer 200 makes another database connection with Librarian 220, submitting the newly generated data (Test Instance, grading data, UID, and choice of Familiar 190). Note that storing a set of Familiars 190 with Apprentice 180 is an implementation detail of this example.

Conjurer 200 then responds back to Apprentice 180 over the network via NAP 290 and then NAP 270, sending the Test Instance and UID, along with the name of the choice of Familiar 190.

Apprentice 180 then writes the Test Instance to disk in text file format, storing the UID as the first line of the file, and the Familiar name as the second, responds to Steward's request for a test for which it has been waiting with the filename and the Familiar 190 applet class (the Familiar 190 is implemented as a Java web browser applet). A "class" in Java, as referred to above, is the unit of code as which a Java applet is implemented. Steward 170 then builds an HTML web page that includes the applet and a suitable reference to the file URL, so the Familiar can deliver the test.

Steward 170 takes the newly generated HTML web page, and typical of all web servers, sends that HTML file over HTTP on the Internet to the Web Browser 260 of the requesting Candidate Computer 250. That Browser sets up the data and begins the test applet Familiar 190, which delivers the test in a graphical user interface environment to the Candidate. After the test completion parameters are fulfilled (expired time limit, answered or passed over all questions, etc.), Familiar 190 uses HTTP to post a response back to Steward 170 (web server) including the Test Instance Unique Identifier (UID) and the answers given for each question. Note that the UID is sufficient, for implementation, to qualify as a Test Instance, since the full set of data delivered is stored to Librarian 220.

Steward 170 takes the data from this post and passes it locally to Apprentice 180, which opens a network connection to Magistrate 210 on Test Content Server 230. Magistrate 210, like Conjurer 200, is running as a stand—alone Component service.

After authenticating the submission by Apprentice 180 of UID and answers, Magistrate 210 opens a database connection to Librarian 220 and requests the grading information for the given UID. Using a grading algorithm appropriate to, and in some cases associated with, the UID, Magistrate 210 processes the given answers compared to the grading information, and produces a Graded Test Instance associated with the UID. Magistrate 210 then opens a database connection to Librarian 220 and stores the grade data and the raw answers given by the Candidate along with the UID. Information in the Librarian database is periodically analyzed by the Test Deliverer statisticians.

IV. Test Validation and Statistical Analysis

The invention provides sophisticated statistical analysis of test results correlated with job performance over time. This analysis improves the quality and grading of tests as the test results of an increasing number of Test Candidates become available. As the number of Test Candidates who have taken a subject area test increases, analysis permits broad conclusions to be reached.

For example, if two people received identical grades on the same subject area test, as the population of test takers in that subject area increases over time, it is possible to state with an increasing degree of confidence that one of them will perform better at a particular job than the other because of the answer pattern embodied in their test results. Even analysis of specific incorrect answers is significant since, in conjunction with correct answers, it provides indications of personality traits, likelihood of job success, and management capability.

This information can be derived by combining test data correlated over time with the progress and behavior of prior Test Candidates, which are tracked by the Test Deliverer. The accuracy of this information will increase along with the population of Test Candidates, permitting normalization of test scores with greater accuracy.

V. Minimization of Cheating

Another important feature of this invention is its substantial minimization of the likelihood of successful cheating on tests delivered over a network. Although direct proctoring is widely regarded as the most successful way to reduce cooperative cheating on tests, the present invention implements other steps in the absence of proctoring which make non-cooperative cheating on tests very difficult. First, when applicable, the Test Definition Question Pool from which each Test Instance is drawn consists primarily of questions designed to test qualitative, rather than quantitative, knowledge. Only a limited number of quantitative type questions, if any, are permitted to be included in each administered test. In other words, questions that could be easily researched in a short period of time are not used.

Instead, questions created by the Test Deliverer require integration of more than one piece of knowledge and experience within the test subject area. For example, the question "What does TCP stand for in a computer networking environment?" would not be used because it is easy to look up quickly. On the other hand, the question "What considerations are most important when choosing which protocol to use as the primary protocol on a LAN" might be used because it is very difficult to look up quickly.

Second, TDL provides a means of specifying a limited amount of time permitted to answer each question of a Test Instance; this feature is used (and implemented in Familiar 190) by the Test Deliverer to limit the amount of time available to each Candidate. Limiting the total Test Instance time, section times, and even individual question times enforces a standard of equivalence among test takers, assuming that the Candidate does not or cannot tamper with the timing mechanism of any Familiar 190. In addition, by limiting question times, slower Candidates, or those stumped on a specific question, are encouraged to move on and test areas of their knowledge with which they may be more familiar. Note that timed questions usually only make sense if a test is defined not to allow a Candidate to return to a previous question, an option available in TDL. Third, as part of the test creation process, a very large Question Pool is provided from which to create a test. Each question in this Question Pool is associated with an Answer Set, typically containing multiple incorrect answers. In creating a typical test, for each question only one of the correct answers is selected, while several incorrect answers are chosen. In addition, having multiple different statements for the same "question" provides even more variety of presentation on a Test Instance. Based on the algorithms used by Conjurer 200 to generate tests, even small tests (20 questions with 40-question pools) are likely to have billions of individual Test Instances possible.

Even if a Candidate could obtain advance access to the Librarian's repository containing an applicable Question Pool, that Candidate would not know which questions would be included in any particular Test Instance. Moreover, if all possible questions were accessed and correct answers to each question researched, a successful cheater would have to have such broad familiarity with the test subject area as to demonstrate the requisite knowledge the test was designed to evaluate.

Fourth, if Test Instance questions are administered in a non-reversible sequence (the Candidate cannot return to a previous question), the system gains an added protection against cheating, as later questions in a test may depend on or disclose correct answers to previously administered questions without compromising the validity of the test. This is a practical application of Ordering Rules, where on a strictly sequenced test, one question may be answered by another as long as the latter appears after the former.

Fifth, due to the high density of test questions and answers in a Test Definition, both correct and incorrect, it becomes virtually useless for Test Candidates to "dump" data from previously administered Test Instances at Internet sites in order to provide unethical assistance to subsequent Test Candidates. Successful dumping has been a problem with other commercial tests and increased the amount of skepticism with which grades on those tests are viewed by Clients.

Sixth, each Test Definition typically employs decoy questions based on factual content that is obscure, but easy to look up with reference materials not permitted to be used by Test Candidates while testing. A Candidate's responses to these questions does not impact her graded results, but instead may indicate if the Candidate is cheating. For example, if a Candidate scores 32% on a test with 23 real questions, yet answers two out of two decoy questions on that test correctly, it is a good indicator (though not, of course, definitive), especially along with others, that the Candidate has cheated on those two questions. This indicator of likely cheating may be reported to an associated Client with appropriate disclaimers.

Finally, during administration of a Test Instance, data may be collected concerning how long a Candidate spends on each question. By comparing this data through statistical analysis to similar data collected from other, prior test takers who are known not to have cheated, and by considering information regarding answers to decoy questions, the probability that any individual Test Candidate has cheated may be calculated. Furthermore, this data is included in the extensive statistical analysis applied to all test data so as to build a profile of each Test Candidate, including predictions on the general likelihood of cheating, probability of success in specific job types, personality characteristics, and whether or not that Candidate is a good test taker.

This invention provides the ability to speedily and easily develop and customize tests at a very low cost. By practicing this invention, it is possible to inform Clients what questions under what Rules should be asked of Candidates so that the Client can obtain reliable information about the Candidate's knowledge in one or more fields. Consequently, test development becomes strongly influenced by statistical analysis of a population of committee-approved questions.

The foregoing invention has been described in terms of the preferred embodiment. However, it will be apparent to those skilled in the art that various modifications and variations can be made in the disclosed process and to the disclosed system architecture without departing from the scope or spirit of the invention. The specification and examples are exemplary only, while the true scope of the invention is defined by the following claims.

What is claimed is:

1. A method for minimizing cheating on any given test instance administered by a test deliverer on behalf of a client to a test candidate over a computer network wherein each test instance is derived from a test definition calling for a predetermined minimum number of questions each of which is associated with multiple answers and wherein the questions are presented in a sequential order to the test candidate comprising the steps of:

developing pools of potential questions and answers designed to integrate both knowledge and experience within a test subject area while avoiding questions which require quantitative responses;

electronically enforcing prespecified, separate time limits for answering each question on the test, each section on the test and for the test as a whole;

prohibiting the test candidate from returning to previous test questions once a subsequent question in the sequence and associated answers has been presented to test candidate;

including decoy questions in the test based on factual information which is obscure but easy to find by using unpermitted reference materials;

monitoring the amount of time spent by each test candidate in answering each question;

statistically analyzing answers to said decoy questions and said answer times by comparing each to the same data derived from previous test takers known not to have cheated on the particular test;

calculating the probability that any given test candidate has cheated on a test based on said statistical analysis; and informing the client of that probability.

2. The method of claim 1 wherein the computer network is the public Internet.

3. The method of claim 1 wherein said enforcing step comprises the further steps of:

monitoring the transfer time required to download information across the Internet to the test candidate; and adjusting said time limits to account for delays caused by said transfer time.

\* \* \* \* \*